United States Patent [19]

Kanayama

[11] Patent Number: 5,073,749

[45] Date of Patent: Dec. 17, 1991

[54] MOBILE ROBOT NAVIGATING METHOD

[75] Inventor: Yutaka Kanayama, Goleta, Calif.

[73] Assignees: Shinko Electric Co., Ltd.; Sogo Securities Co., Ltd., both of Tokyo, Japan

[21] Appl. No.: 540,151

[22] Filed: Jun. 19, 1990

[30] Foreign Application Priority Data

Jun. 22, 1989 [JP] Japan .................. 1-158250

[51] Int. Cl.$^5$ .............................................. G06F 15/50
[52] U.S. Cl. ................................. 318/587; 318/568.10; 318/585; 364/424.01; 364/424.02; 901/1; 395/1
[58] Field of Search ............... 318/587, 139, 586, 585, 318/568.10; 364/513, 424.01, 424.02; 901/1; 180/167, 165, 168, 169

[56] References Cited

U.S. PATENT DOCUMENTS

| 4,486,694 | 12/1984 | Ohba et al. ............... 364/44.02 X |
| 4,638,445 | 1/1987 | Mattaboni ................. 901/47 X |
| 4,652,803 | 3/1987 | Kamejima et al. ........ 364/513 X |
| 4,679,808 | 7/1987 | Ito et al. ................... 364/424.01 |
| 4,761,595 | 8/1988 | Goor ......................... 318/567 |
| 4,777,416 | 10/1988 | George, II. et al. ...... 364/513 X |
| 4,821,192 | 4/1989 | Taivalkoski et al. ..... 364/424.02 |
| 4,875,172 | 10/1989 | Kanayama ............... 364/513 |
| 4,890,233 | 12/1989 | Ando et al. ............... 318/587 X |

Primary Examiner—Paul Ip
Attorney, Agent, or Firm—Flynn, Thiel, Boutell & Tanis

[57] ABSTRACT

A mobile robot navigating method for navigating an autonomous mobile robot utilizes a path planning unit, a posture control unit, a command signal converting unit, a current posture computing unit and a running mechanism, such as an autonomous carrier vehicle, capable of quickly and accurately controlling the mobile robot for steady running to a desired posture along a specified path. The mobile robot is controlled for running by a speed command including a desired speed for feed-forward control a speed correction for feed back control, and an angular velocity command including a desired angular velocity for feed-forward control and an angular velocity correction for feedback control. The mobile robot is controlled in a feed back and feed-forward control mode using the speed command and the angular velocity command so as to run steadily along an optimum path to a desired posture without meandering.

5 Claims, 3 Drawing Sheets

MOBILE ROBOT NAVIGATING METHOD

BACKGROUND OF THE INVENTION

1. Field of the Invention

The present invention relates to a mobile robot navigating method for controlling a mobile robot, such as an autonomous carrier vehicle, for steady running.

2. Description of the Prior Art

A mobile robot navigating method for controlling a mobile robot for running is disclosed in Japanese Patent Laid-open (Kokai) No. 57-62424. According to this known method, a desired running path for the mobile robot is specified digitally by a plurality of coordinates $(x_i, y_i)$ ($i = 1, 2, \ldots$ and n), domains relating to the plurality of coordinates are supposed, the next domain into which the mobile robot is to move is specified on the basis of a current position and the next supposed position, and the mobile robot is steered on the basis of information representing a point on a path passing at least two positions in the specified domain and the next supposed position with respect to the running direction of the mobile robot.

This known mobile robot navigating method controls the mobile robot in a feedback control mode so that a current running mode of the mobile robot conforms to speed command and an angular velocity command produced on the basis of given information representing a desired posture. In this specification, a posture is expressed by a triple $(x, y, \theta)$, where x and y are the coordinates of a location of the mobile robot on a Cartesian coordinate system and $\theta$ is the angular orientation of the mobile robot with respect to an axis of the Cartesian coordinate system. However, the accuracy and response characteristics of such control of the mobile robot are not satisfactory.

SUMMARY OF THE INVENTION

Accordingly, it is an object of the present invention to provide a mobile robot navigating method capable of quickly and accurately controlling the mobile robot for steady running to a desired posture along a specified path.

In a first aspect of the present invention, a mobile robot navigating method uses the sum of a desired speed and a speed correction, and the sum of a desired angular velocity and an angular velocity correction as a speed command and an angular velocity command, respectively, for the feedback and feed forward control of the mobile robot.

In a second aspect of the present invention, a mobile robot navigating method uses speed and angular velocity corrections calculated by using data of a desired posture, i.e., data representing an error direction and an error position, on a local coordinate system having its origin at a current position and the positive X-axis extending in a current running direction.

In a third aspect of the present invention, a mobile robot navigating method replaces the current posture stored in a register included in a current posture calculating unit with an actual posture when the actual posture of the mobile robot detected by an actual posture detecting unit deviates from the calculated current posture of the mobile robot.

Thus, the speed command includes a speed correction determined on the basis of the difference between a desired posture and a current posture, and a desired speed, and the angular velocity command includes an angular velocity correction determined on the basis of the difference between a desired posture and a current posture, and a desired angular velocity. The mobile robot is controlled in a feedback and feed-forward control mode so as to run according to the speed command and the angular velocity command including correction components. Thus, the mobile robot runs steadily along an optimum path to a desired posture without meandering.

The use of the local coordinate system having its origin at a current position and the positive X-axis extending in a current running direction for defining a desired posture enables rapid calculation for a speed correction and an angular velocity correction.

The replacement of the current posture calculated by integration of revolutions of the wheels with a sensed actual posture when the actual posture deviates from the current posture enables the real-time correction of an error in posture resulting from the accumulation of detection errors and wheel slips, and hence an actual running path coincides precisely with a specified running path.

The above and other purposes, features and advantages of the present invention will become more apparent from the following description taken in conjunction with the accompanying drawings.

DETAILED DESCRIPTION OF THE PREFERRED EMBODIMENTS

Figure 1:
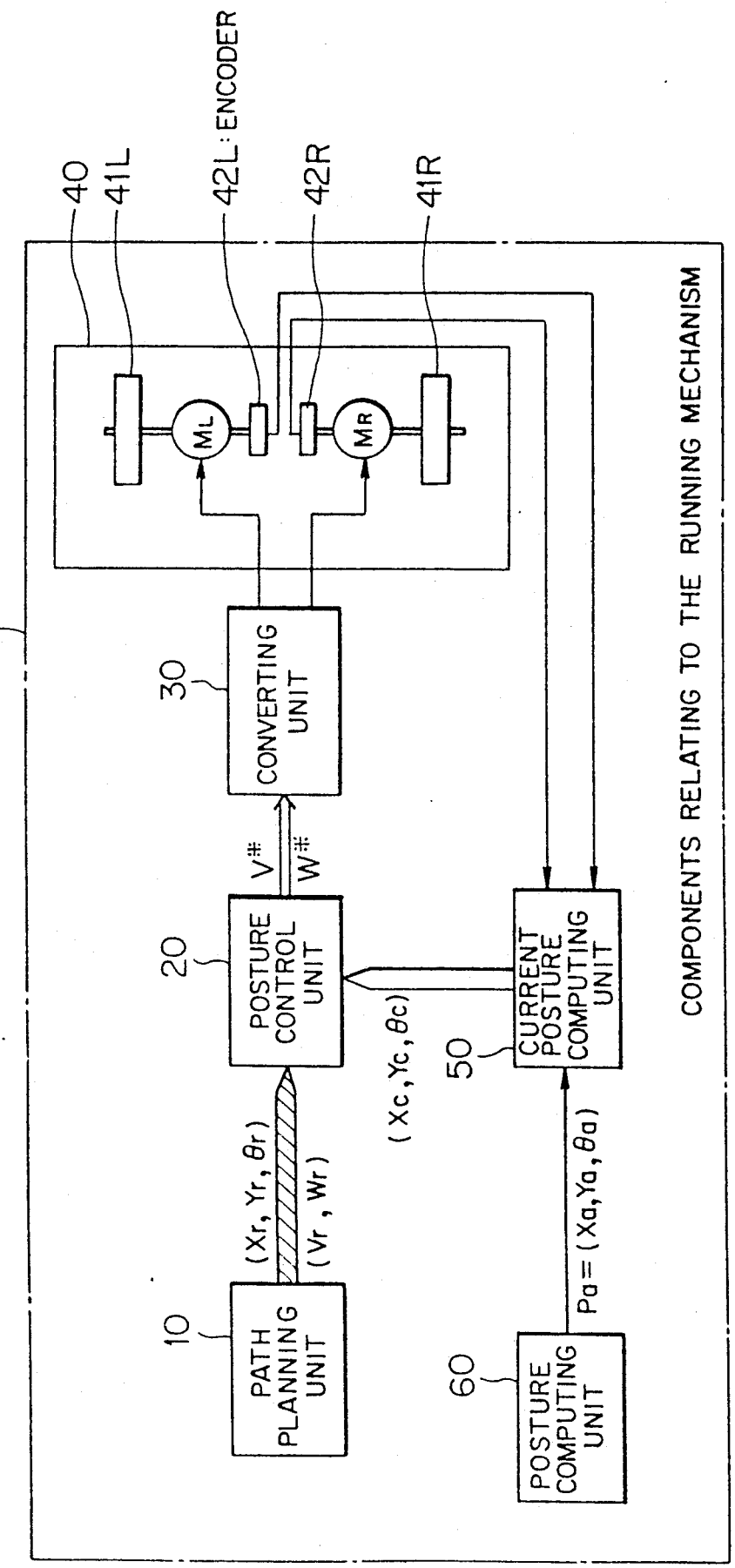
FIG. 1 is a block diagram of a control system for carrying out a mobile robot navigating method in a first embodiment according to the present invention.
Figure 2:
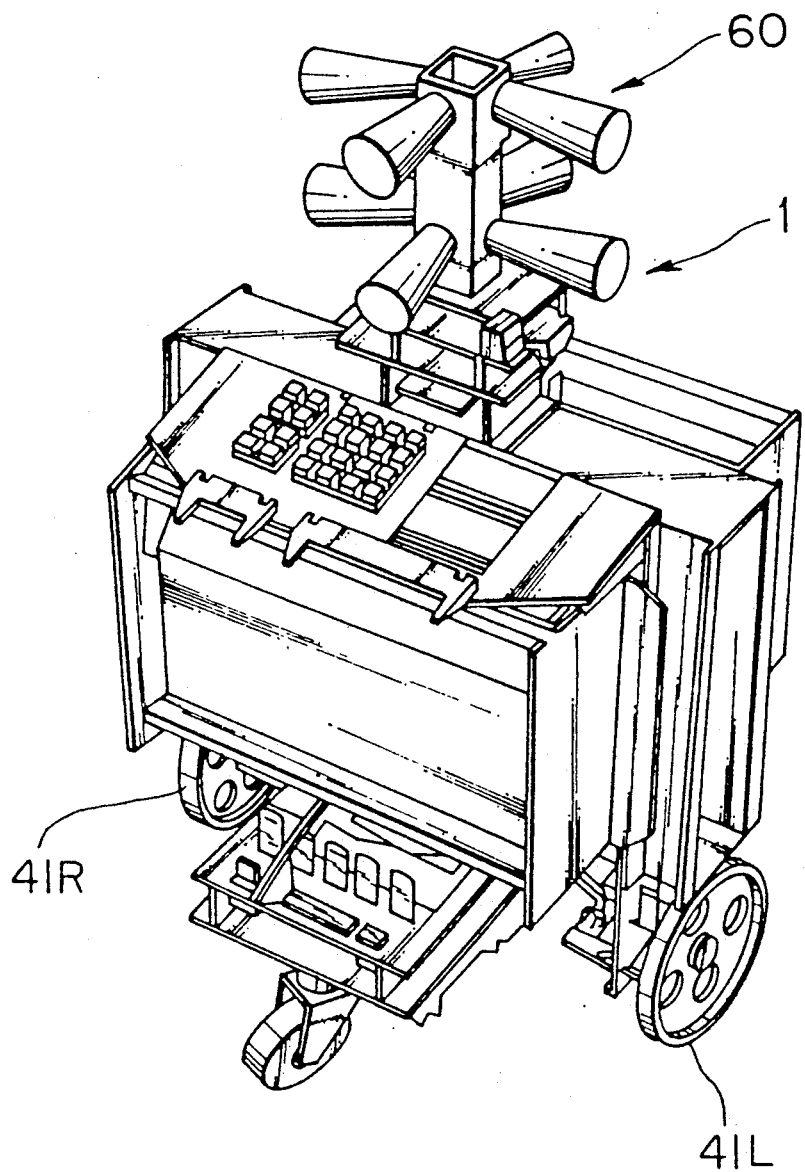
FIG. 2 is a perspective view of an exemplary mobile robot to be controlled by the control system of FIG. 1.

An autonomous mobile robot 1 to be navigated by a mobile robot navigating method in accordance with the present invention has a motor-wheel steering (speed difference) system having the appearance shown in FIG. 2 and is equipped with a running mechanism 40 and a control system shown in FIG. 1.

Referring to FIG. 1, the control system comprises a path planning unit 10, a posture control unit 20, a converting unit 30, a current posture computing unit 50 and an actual posture computing unit 60. The running mechanism 40 comprises individual driving motors MR and ML, driving wheels 41R and 41L which are driven respectively by the driving motors MR and ML, free wheels, and encoders 42R and 42L directly associated with the output shafts of the driving motors MR and ML, respectively. The output signals of the encoders 42R and 42L are applied to the current posture computing unit 50. The actual posture computing unit 60 determines the actual posture of the mobile robot 1 by processing data obtained by sensors and data obtained from a map.

Figure 3:
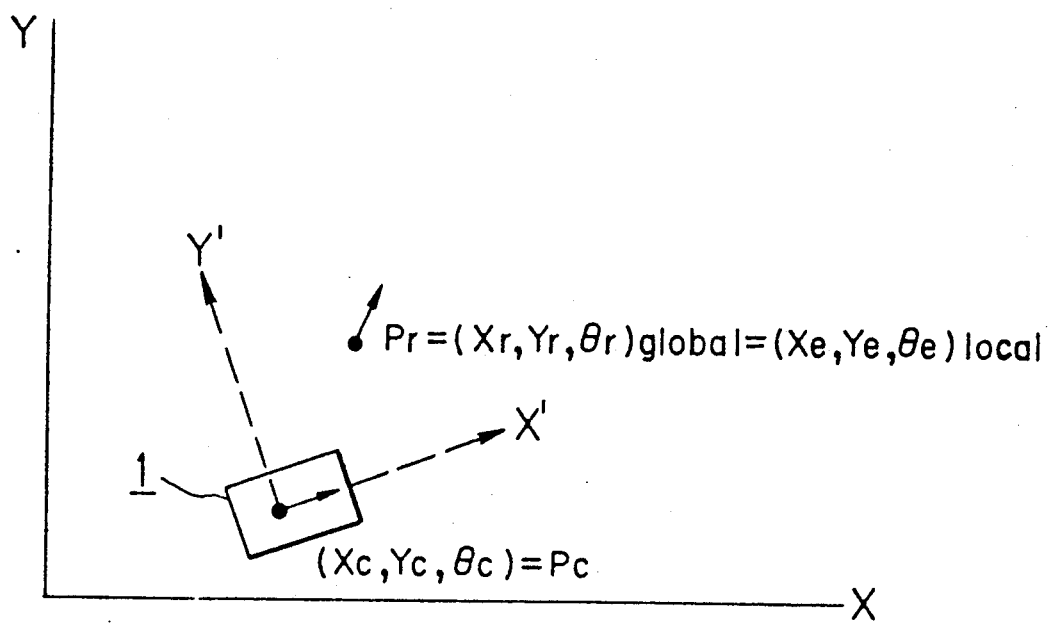
FIG. 3 is a graph of assistance in explaining the relation between a desired posture and a coordinate system.

Referring to FIG. 3 showing coordinate systems for expressing the posture of the mobile robot, $P_r$ indicates a desired posture of the mobile robot 1, and $P_c$ indicates a current posture of the mobile robot 1. A local Cartesian coordinate system X'−Y' has it origin at a current position represented by coordinates $(x_c, y_c)$ on a global Cartesian coordinate system, and the X'-axis extending in the current derection $\theta_c$.

The path planning unit 10 specifies a running path and gives desired running data $D_r$ periodically at regular time intarvals T. The desired running data $D_r$ includes a desired posture $P_r(x_r, y_r, \theta_r)$, a desired running speed $V_r$ and a desired angular velocity $\omega_r$.

The current posture computing unit 50 samples the output signals of the encoders 42R and 42L at the predetermined time intervals T, computes the current posture $P_c(x_c, y_c, \theta_c)$ and gives the current posture $P_c$ to the posture control unit 20.

The posture control unit 20 calculates the difference of the current $P_c$ from the desired posture $P_r$, namely, a posture error $(x_e, y_e, \theta_e)$.

$$x_e = (x_r - x_c)\cdot\cos\theta_c + (y_r - y_c)\cdot\sin\theta_c \quad (1)$$

$$y_e = (x_r - y_c)\cdot\sin\theta_c + (y_r - y_c)\cdot\cos\theta_c \quad (2)$$

$$\theta_e = \theta_r - \theta_c \quad (3)$$

Then, the posture control unit 20 calculates a speed command $V^*$ and an angular velocity command $\omega^*$ on the basis of the posture error $(X_e, Y_e, \theta_e)$ and gives the results of calculation to the converting unit 30.

$$v^* = v_r + k_x x_e - v_r(1 - \cos\theta_e) \quad (4)$$

$$\omega^* = \omega_r + k_y y_c + k_\theta \sin\theta_e \quad (5)$$

where $k_x$, $k_y$ and $k_\theta$ are positive constants. In the Expressions (4) and (5), the first term is a feed-forward term, and the rest are feedback terms. The converting unit 30 converts the speed command $v^*$ and the angular velocity command $\omega^*$ into speed commands and angular velocity commands respectively for the right driving wheel 41R and the left driving wheel 41L.

Thus, the mobile robot 1 is controlled in a feedback and feed-forward control mode according to the speed command $v^*$ and the angular velocity command $\omega^*$ including corrections for steady running to a desired posture along an opimum path without meandering. Thus use of the local Cartesian coordinate system X'−Y' having its origin at the current position $(x_c, y_c)$ and the X'-axis extending in the current direction $\theta_c$ for expressing the desired posture $P_r$ enables the rapid calculation of a speed correction and an angular velocity correction.

Figure 4:
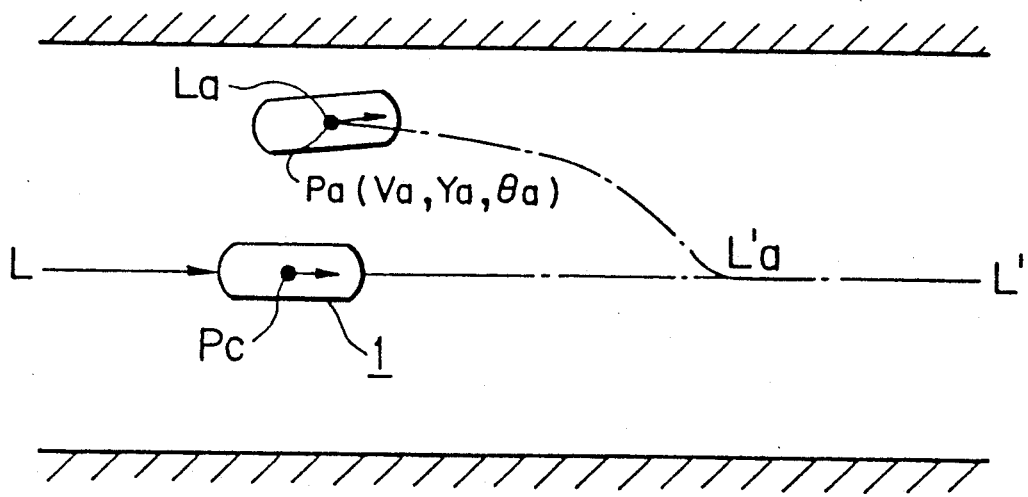
FIG. 4 is an illustration of assistance in explaining a mobile robot navigating method in a second embodiment according to the present invention, showing a running path.

A mobile robot navigating method in a second embodiment according to the present invention will be described hereinafter with reference to FIG. 4. Suppose that the mobile robot 1 is running along a path L—L', namely, the mobile robot 1 is running to the right along the path L—L' to a desired posture $P_r$ specified by a path specifying unit 10. In a steady state, the mobile robot 1 runs toward the specified desired posture $P_r$ and a current posture $P_c$ is approximately equal to the desired posture $P_r$. In some cases, however, the actual posture $P_a(x_a, y_a, \theta_a)$ deviates from the current posture $(x_c, y_c, \theta_c)$. The actual posture $P_a$ is determined by comparing data obtained by sensors with a map. When the actual posture $P_a$ deviates greatly from the current posture $P_c$, the current posture $P_c$ is changed for the actual posture $P_a$ to achieve the correction of the posture of the mobile robot 1 easily in a short time. Since the desired posture $P_r$ is on the specified path L—L', the current posture $P_c$ deviates greatly from the desired posture $P_r$, and hence the mobile robot 1 returns through a path $L_a$—$L_a'$ to the specified path L—L'.

Thus, the mobile robot navigating method in the second embodiment is capable of rapidly correcting the deviation of the current posture $P_c$ from the desired posture $P_r$ attributable to slips of the driving wheels and irregularities in the surface of the running path so that the mobile robot 1 runs steadily along the specified path.

Although the invention has been described as applied to navigating a mobile robot of a driving wheel control system which steers the mobile robot by driving the driving wheels 41R and 41L respectively at inedependent rotating speeds, the present invention is applicable also to a mobile robot provided with a steering mechanism different from this driving mechanisms.

Although the invention has been described in its preferred forms with a certain degree of particularity, obviously many changes and variations are possible therein. It is therefore to be understood that the present invention may be practiced otherwise than as specifically described herein without departing from the scope and spirit thereof.

What is claimed is:

1. A mobile robot navigating method for navigating an autonomous mobile robot comprising a path planning unit, a posture control unit, a command signal converting unit, a current posture computing unit, and a running mechanism, said method comprising:

obtaining current robot posture data based on travelling operations executed by the robot;

periodically sending said current posture data from the current posture computing unit to the posture control unit at predetermined time intervals;

obtaining speed correction feedback control data and angular velocity correction feedback control data;

periodically feeding forward from the path planning unit to the posture control unit (1) desired posture data, (2) a desired speed feed-forward command which is independent of said speed correction feedback control data, and (3) a desired angular velocity feed-forward command which is independent of said angular velocity correction feedback control data;

calculating, by means of said posture control unit, a speed command which is based on said desired speed feed-forward command and said speed correction feedback control data, and an angular velocity command which is based on said desired angular velocity feed-forward command and said angular velocity correction feedback control data; and converting, by means of said command signal converting unit, the speed command and the angular velocity command into running commands for controlling the running mechanism to make the running mechanism operate according to the running commands.

2. A mobile robot navigating method according to claim 1, wherein the desired posture data is expressed by a triple of a local Cartesian coordinate system having its origin at a current position defined by the current posture data and having an X - axis extending in a current direction defined by the current posture data, and the speed correction feedback control data and the angular velocity correction feedback control data are calculated on the basis of the difference between the desired posture data and the current posture data expressed by the triple of the local Cartesian coordinate system.

3. A mobile robot navigating method according to claim 2, wherein an actual posture detecting unit detects an actual posture, and current posture data stored in the current posture computing unit is replaced by actual posture data provided by the actual posture detecting unit when the actual posture detected by the actual posture detecting unit deviates greatly from the current posture data stored in the current posture computing unit.

4. A mobile robot navigating method according to claim 1, wherein an actual posture detecting unit detects an actual posture, and current posture data stored in the current posture computing unit is replaced by actual posture data provided by the actual posture detecting unit when the actual posture detected by the actual posture detecting unit deviates greatly from the current posture data stored in the current posture computing unit.

5. A mobile robot navigating method according to claim 1, wherein said step of obtaining said speed correction feedback control data and said angular velocity correction feedback control data includes the step of calculating a difference between said current posture data and said desired posture data, and said method including the steps of determining actual posture data based on the actual posture of the robot, and substituting said actual posture data for said current posture data in said difference determining step whenever said actual posture data deviates from said current posture data by at least a predetermined amount.

* * * * *